(12) United States Patent
Abbasi et al.

(10) Patent No.: US 8,664,563 B2
(45) Date of Patent: Mar. 4, 2014

(54) PURGING AND DEBRIS REMOVAL FROM HOLES

(75) Inventors: Hamid Ali Abbasi, Naperville, IL (US); Roger Schultz, Ninnekah, OK (US)

(73) Assignees: Gas Technology Institute, Des Plaines, IL (US); Halliburton Energy Services, Inc., Houston, TX (US)

( * ) Notice: Subject to any disclaimer, the term of this patent is extended or adjusted under 35 U.S.C. 154(b) by 316 days.

(21) Appl. No.: 13/004,352

(22) Filed: Jan. 11, 2011

(65) Prior Publication Data
US 2012/0175354 A1 Jul. 12, 2012

(51) Int. Cl.
*B23K 26/14* (2006.01)
*B23K 26/38* (2006.01)

(52) U.S. Cl.
USPC .................. 219/121.71; 219/121.84

(58) Field of Classification Search
USPC ........ 299/29–78; 219/121.67–121.72, 121.84
See application file for complete search history.

(56) References Cited

U.S. PATENT DOCUMENTS

| | | | |
|---|---|---|---|
| 3,045,769 A * | 7/1962 | Feucht et al. ................. | 175/211 |
| 3,139,704 A | 7/1964 | McCune | |
| 4,203,778 A | 5/1980 | Nunciato et al. | |
| 4,227,582 A * | 10/1980 | Price ............................ | 175/16 |
| 5,609,781 A * | 3/1997 | Kaga et al. ................ | 219/121.84 |
| 5,630,807 A * | 5/1997 | Joffe ............................ | 604/315 |
| 5,925,024 A * | 7/1999 | Joffe ............................ | 604/313 |
| 6,316,743 B1 * | 11/2001 | Nagahori et al. ........ | 219/121.67 |
| 6,880,646 B2 | 4/2005 | Batarseh | |
| 7,214,904 B2 * | 5/2007 | Zeltner ...................... | 219/121.7 |
| 7,279,020 B2 | 10/2007 | Christiansen et al. | |
| 7,301,121 B2 * | 11/2007 | Callies et al. ............ | 219/121.61 |
| 7,490,664 B2 | 2/2009 | Skinner et al. | |
| 2004/0226927 A1 * | 11/2004 | Morikazu et al. ........ | 219/121.84 |
| 2006/0060303 A1 | 3/2006 | Fink et al. | |
| 2006/0108341 A1 * | 5/2006 | Alips et al. ............... | 219/121.84 |
| 2007/0010069 A1 * | 1/2007 | Bushroe et al. .............. | 438/473 |
| 2010/0015576 A1 * | 1/2010 | Altshuler et al. ............ | 433/218 |
| 2010/0044104 A1 | 2/2010 | Zediker et al. | |

* cited by examiner

*Primary Examiner* — Samuel M Heinrich
(74) *Attorney, Agent, or Firm* — Pauley Petersen & Erickson (57) ABSTRACT

A method for purging of, and debris removal from, a hole created with laser energy in which a swirling purge gas stream is provided in a hole containing debris to be removed, imparting a swirl to the debris and lifting the debris from a bottom of the hole. In accordance with one embodiment, the purge gas is swirled in a purge gas nozzle providing purge gas into the hole. In accordance with another embodiment of this invention, the purge gas is swirled directly in the hole.

24 Claims, 8 Drawing Sheets

(Prior Art)

Fig. 1

(Prior Art)

Fig. 2

(Prior Art)

Fig. 3

(Prior Art)

PURGING AND DEBRIS REMOVAL FROM HOLES

BACKGROUND OF THE INVENTION

1. Field of the Invention

This invention relates to a method for purging of, and debris removal from, surfaces being subjected to laser beams for the purpose of creating holes. In one aspect, this invention relates to a method for purging of, and removing debris from, holes produced by laser drilling. In one aspect, this invention relates to a method for purging of, and removing debris from, wellbores and wellbore perforations.

2. Description of Related Art

Figure 1:
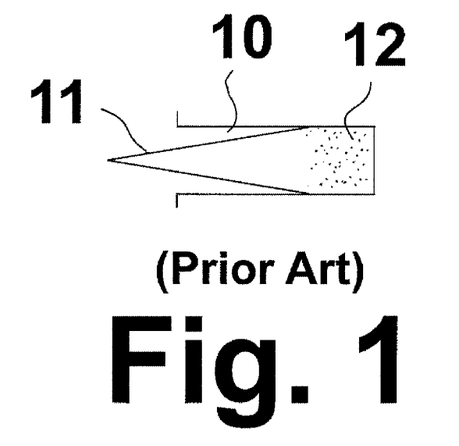
FIG. 1 is a diagram illustrating the use of laser energy to produce a hole where debris, which acts to absorb laser energy, is formed from the lasing process.

When a laser beam is used to make a hole in solid materials through thermal and/or chemical spallation, melting, or material weakening, debris is created which must be removed to expose a fresh surface to which the laser beam can be applied, thereby increasing the effectiveness of hole formation, and increasing the rate of penetration by the laser beam. FIG. 1 shows a hole 10 created by a laser beam 11 and producing debris 12 to be removed from the hole. The material or debris resulting from the application of a laser beam to a hole wall and/or hole bottom may be vapor, molten, or solid particles or chunks. Some of the material or debris may stay attached to the hole wall and/or hole bottom surface while some of the material or debris may separate therefrom. The debris, whether loose or stuck to such surfaces, absorbs at least some of the laser energy, thereby preventing it from reaching the underlying surface to which the laser energy is being applied and reducing the effectiveness of the laser energy. If the material or debris is not removed continuously or intermittently, it may continue to absorb portions of the laser energy, resulting in the formation of molten material that sticks to the hole wall and/or bottom surfaces and further adversely impacting the hole shape, the hole surface, and the rate of penetration. Thus, it is desirable to promptly remove the debris from the hole so as to maximize laser energy transmission to the surface to which the laser beam is being applied and to expose fresh surface for treatment. It is also desirable to remove the debris using means, such as a gas jet impinging on the lased surface, that does not absorb laser energy.

Figure 2:
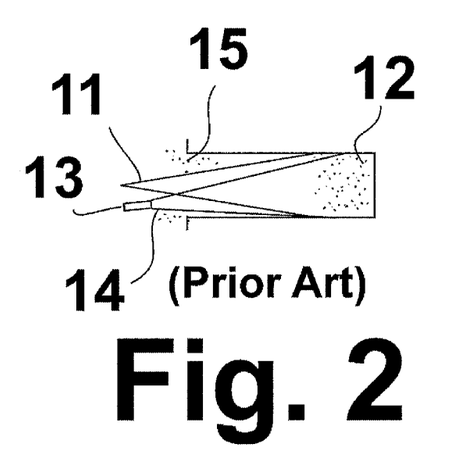
FIG. 2 is a diagram illustrating the conventional use of purge gas in conjunction with the lasing process for the purpose of removing debris generated by the lasing process.
Figure 3:
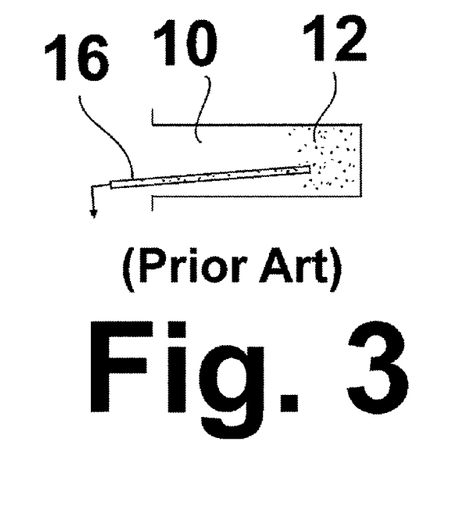
FIG. 3 is a diagram illustrating the conventional use of vacuum as a means for removing debris generated by the lasing process.
Figure 4:
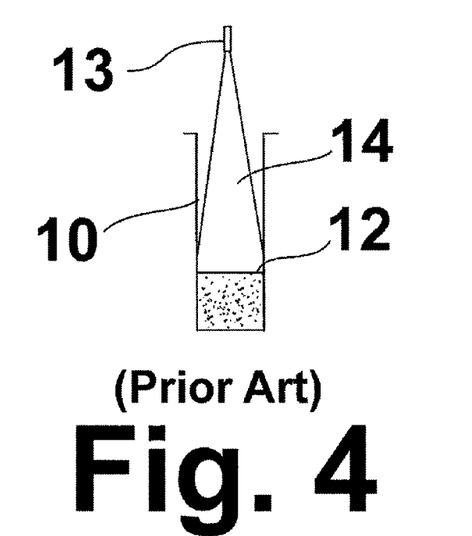
FIG. 4 is a diagram illustrating the inability of a conventional purge gas process stream to remove debris from the bottom of a wellbore.

One commonly employed approach is to use a purge gas nozzle 13 to provide a straight gas jet 14 of sufficient flow and velocity into the hole to impinge on the lased surface, loosen any sticking debris, and remove the debris 15 from the hole together with any self loosened debris as shown in FIG. 2. Another approach is to use a mechanical nozzle 16 to vacuum the surface being lased as shown in FIG. 3. The first approach is effective in relatively shallow holes and in holes with an opening near the back to allow exiting of at least a portion of the purge gas; but with substantially closed end or deeper holes with a depth to diameter ratio of 5 or greater, this technique becomes less effective as the inherently expanding gas jet 14 loses momentum, traps gases in the hole and is unable to penetrate and impinge on the lased surface near the end of the hole as shown in FIG. 4.

Tests have shown a maximum purge gas jet penetration of about 14 inches in a 2 inch diameter hole, regardless of the jet velocity at the nozzle exit. An approximately 2 inch diameter by 24 inch deep, close-ended hole was filled with fine sand and an approximately ½ inch diameter air nozzle was positioned proximate the opening of the hole with its axis substantially parallel to the hole axis. Tests were carried out using air with nozzle pressures of up to 100 psig. The tests showed that, even at 100 psi pressure, the air was not able to lift the fine sand out of the hole beyond the first 14 inches.

Fluid dynamics modeling carried out with relatively high nozzle pressures showed similar results. To obtain the maximum achievable depth, one approach is to progress the purge gas nozzle into the hole as the hole gets deeper. However, this approach results in shadowing of the laser beam, heating of the nozzle, and a generally non-symmetrical hole. Similar issues are encountered when attempting to use a vacuum which requires that the tip of the vacuum be placed close to the surface being vacuumed. As is well known, the effectiveness of vacuuming drops rapidly as the distance between the surface being vacuumed and the nozzle tip increases. In addition, in difficult to access remotely controlled applications, such as when making holes in an energy extraction wellbore, it is difficult to maneuver the nozzle to progress into a hole in the sidewall of the wellbore, and especially deep into the hole.

SUMMARY OF THE INVENTION

It is, thus, one object of this invention to provide a method for purging of, and debris removal from, holes having a depth to diameter ratio greater than or equal to about 5.

It is one object of this invention to provide a method for purging of, and debris removal from, holes which promptly removes the debris substantially as it is generated so as to maximize laser energy transmission to the surface being lased and expose fresh surfaces for lasing.

It is another object of this invention to provide a method for purging of, and debris removal from, holes which does not absorb substantial amounts of laser energy.

It is another object of this invention to provide a method for purging of, and debris removal from, holes which avoids the problems of laser beam shadowing, purge gas nozzle heating, and the formation of non-cylindrical holes as occurs with conventional purge gas systems employed for hole purging and debris removal.

These and other objects of this invention are addressed by a method for purging of, and debris removal from, a hole in which a swirling purge gas stream is introduced into a hole containing debris to be removed, imparting a swirl to the debris and lifting the debris from a bottom of the hole. Swirling of the purge gas may be accomplished by a variety of means as discussed in more detail herein below.

Debris generated during the lasing process may vary widely in size from microscopic particles to chips of about 0.5 to 1 inch equivalent spherical diameters (diameter of a sphere of similar volume). The density of the particles depends on the material to which the laser beam is being applied, whether or not a mist is employed, whether or not the material is spalled, generally retaining the density of the original material, and whether or not the material is melted, which would increase the density.

The purge gas flow rates and stream velocities for effecting the method of this invention may be calculated using standard well established fluidization calculations based on the hole diameter. To effectively remove the debris, the purge gas stream velocity (defined as the total flow rate from all streams into the hole divided by one half the cross-section of the hole) should be at least equal to, and preferably greater than, the terminal velocity of the largest debris pieces that are to be removed. One-half of the cross-section is used because the purge gas flow across about one half the cross-section will be towards the debris at the end of the hole, and the flow across the other half of the hole cross-section will be away from the debris at the end of the hole.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 5:
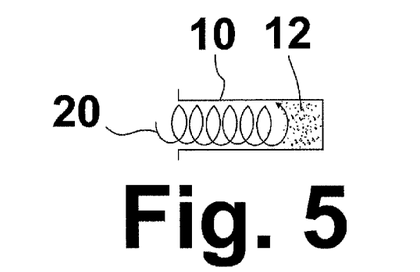
FIG. 5 is a diagram illustrating the general concept of this invention in which a swirling purge gas stream is employed for the purpose of removing debris generated during the lasing process.

The method of this invention addresses the deficiencies of the aforementioned conventional approaches for penetrating relatively deep and substantially closed-end holes by increasing the penetration of the purge gas streams into the holes. Increasing the penetration is achieved by imparting a degree of swirl to the gas flow stream 20 within the hole to control the expansion and flow pattern of the stream as shown in FIG. 5.

Figure 6:
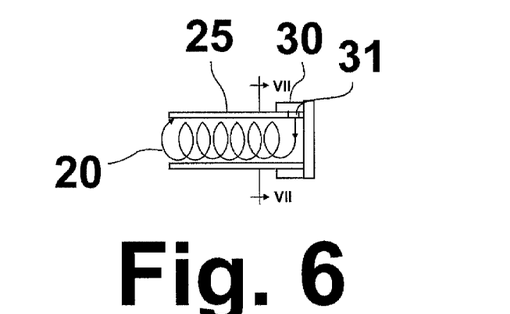
FIG. 6 is a diagram showing one method of generating a swirling purge gas stream within a purge gas nozzle in accordance with one embodiment of this invention.
Figure 7:
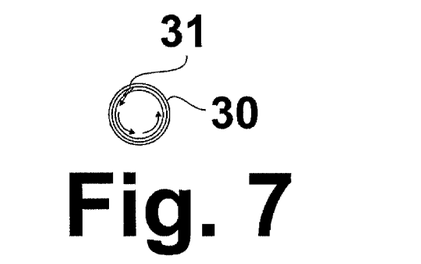
FIG. 7 is a view of the purge gas nozzle of FIG. 6 taken along the line VII-VII.
Figure 8:
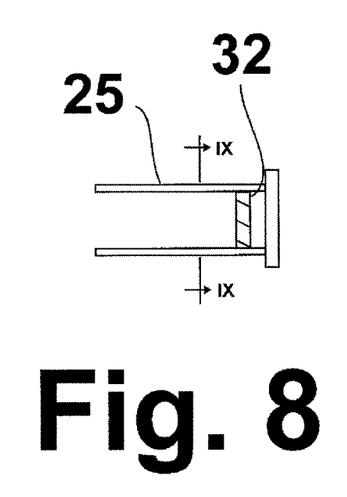
FIG. 8 is a diagram showing another method of generating a swirling purge gas stream in a purge gas nozzle in accordance with one embodiment of this invention.
Figure 9:
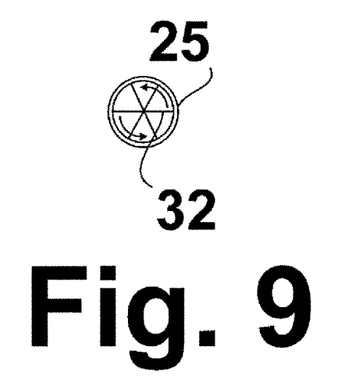
FIG. 9 is a view of the purge gas nozzle of FIG. 8 taken along the line IX-IX.

Swirling of the purge gas stream may be achieved in a purge gas nozzle 25 in accordance with one embodiment of this invention by introducing the purge gas exiting a plenum 30 through an opening 31 into the purge gas nozzle as illustrated in FIGS. 6 and 7. In accordance with one embodiment of this invention as shown in FIGS. 8 and 9, swirling of the purge gas stream in the purge gas nozzle 25 is achieved using a swirl plate 32 disposed within the purge gas nozzle. Such swirl plates are well known to those skilled in the art. Any other technique for imparting a swirl to a fluid stream known to those skilled in the art may also be employed.

Figure 10:
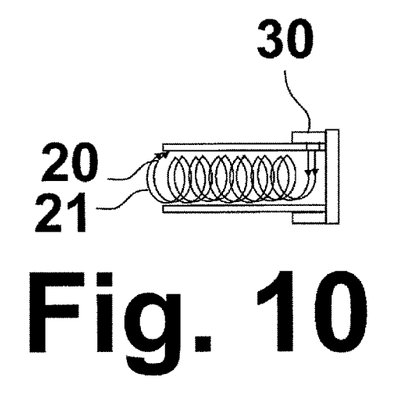
FIG. 10 is a diagram showing the use of multiple parallel swirling purge gas streams in accordance with one embodiment of this invention.
Figure 11:
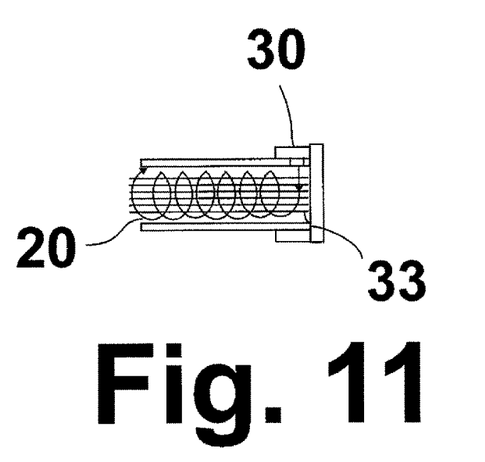
FIG. 11 is a diagram showing the use of a combination of swirling and straight purge gas streams in accordance with one embodiment of this invention.

Multiple swirl patterns including parallel flow streams as shown in FIG. 10 and combination straight/swirl flow streams as shown in FIG. 11 may be used to achieve the desired jet penetration and surface impingement. Two or more parallel flow streams at the same total flow rate and velocity will have a lower Reynolds number (Re) than a single stream. Thus, the use of multiple parallel flow streams in accordance with one embodiment of this invention reduces the Reynolds number and flow stream turbulence compared with a single stream, allowing the use of higher flow stream velocities, densities, and total flow rates while maintaining the same Reynolds number, increasing penetration into the hole and debris fluidization. The use of multiple flow streams also allows the use of different fluids based on the characteristics of the debris generated in the inner and outer zones of the hole (heavier fluid for larger debris and lighter fluid for smaller debris), where the outer swirling flow allows narrowing the expansion of the inner flow streams to increase their penetration. In accordance with one embodiment of this invention, the desired purge gas swirl flow patterns are created using a plurality of purge gas nozzles.

Figure 12:
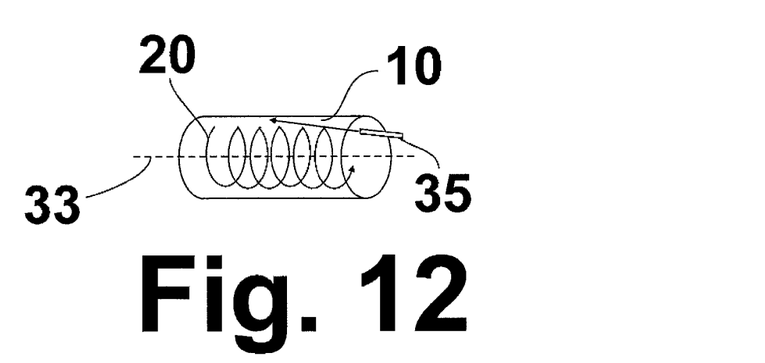
FIG. 12 is a diagram showing the generation of a swirling purge gas stream directly in a hole through a purge gas nozzle in accordance with one embodiment of this invention.
Figure 13:
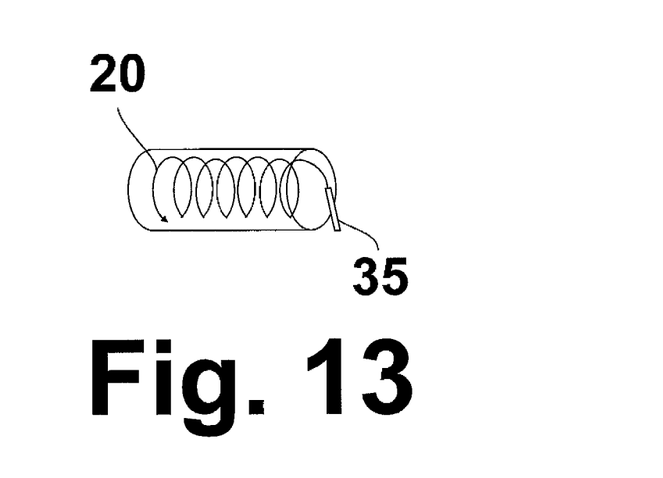
FIG. 13 is a diagram showing the generation of a swirling purge gas stream directly in a hole using tangential purge gas injection in accordance with one embodiment of this invention.

In accordance with one embodiment of this invention, a purge gas is introduced into the hole 10 in an area between the hole axis 33 and the hole wall through a purge gas nozzle 35 with a purge gas stream axis oriented substantially parallel to, or at a slight angle towards/away from the wall as shown in FIG. 12, thereby creating a cyclonic/swirling flow of fine debris particles proximate the bottom of the hole. In accordance with one embodiment of this invention, the purge gas stream axis is oriented at a less than 90° angle to the hole wall as shown in FIG. 13 to enhance the generation of swirl at certain conditions. Proper orientation of the purge gas nozzle and flow parameters creates swirl at the top of the hole to swirl the debris at the bottom of the hole. In substantially vertical hole orientations, depending on the size of the debris, the debris might fall off while the purge gas is on.

In accordance with one embodiment of this invention, the purge gas is pulsed between on and off conditions or between high and low flow rates to enable the debris to fall down when the purge gas is off or at a low flow rate. In this case, the laser beam may be continuously on or may be pulsed, preferably in sync, in phase or out of phase, with the pulsing of the purge gas.

In accordance with one embodiment of this invention, the purge gas is saturated with a liquid mist to increase the purge gas density, reduce the purge gas stream expansion, increase thermal quenching of the lased surface, and increase the rate of debris generation and hole penetration.

Figure 14:
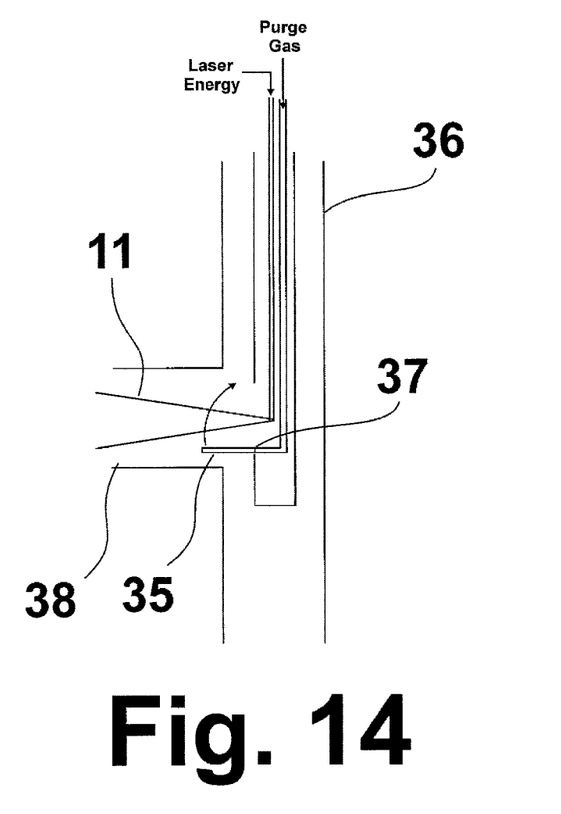
FIG. 14 is a diagram showing a mechanism for altering the direction of a purge gas nozzle between a wellbore and a wellbore perforation in accordance with one embodiment of this invention.

The purge gas nozzle 35 for use in the method of this invention may be located within the wellbore 36 during non-use periods and provided into a wellbore perforation 38 when needed by means of a simple mechanism, e.g. a hinge mechanism 37, as shown schematically in FIG. 14, to increase its effectiveness in terms of more defined swirl streams and the percent of fluid that goes into the hole versus staying outside the hole.

The preferred purge gas used in the method of this invention may be selected from the group consisting of inert gases, gases containing oxygen, hydrocarbon gases, and mixtures thereof. The preferred mist forming liquid suitable for mixing with the purge gas may be selected from the group consisting of water, water salt solutions, hydrocarbon liquids, and mixtures thereof.

Figure 15:
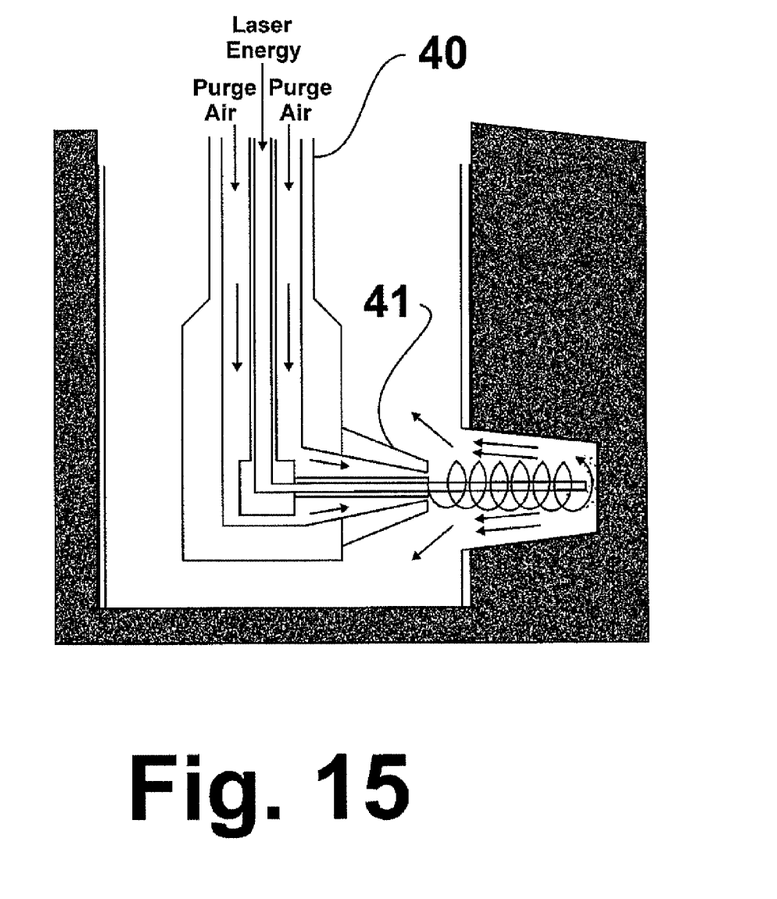
FIG. 15 is a diagram showing a laser material processing tool employing a swirl nozzle in accordance with one embodiment of this invention.

FIG. 15 is a drawing showing a laser tool 40 comprising a swirl nozzle 41 for creating a swirl within a wellbore perforation in accordance with one embodiment of this invention.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for purging of and debris removal from a hole comprising the steps of:
    providing a swirling purge gas stream in a hole containing debris to be removed, wherein said debris is produced by a laser beam for increasing a depth of said hole;
    imparting a swirl to said debris; and
    lifting said debris from a bottom of said hole.

2. The method of claim 1, wherein said hole has a depth to diameter ratio greater than or equal to about 5.

3. A method, for purging of and debris removal from a hole comprising the steps of:
    providing a swirling purge gas stream in a hole containing debris to be removed, wherein said debris is produced by a laser beam for increasing a depth of said hole;
    imparting a swirl to said debris; and
    lifting said debris from a bottom of said hole,
    wherein a longitudinal axis of said swirling purge gas stream is spaced apart from a hole axis of said hole.

4. The method of claim 1, wherein said swirling purge gas stream is produced from a purge gas source at a pressure of at least about 100 psi.

5. The method of claim 3, wherein said longitudinal axis of said swirling purge gas stream is substantially parallel to said hole axis.

6. The method of claim 3, wherein said longitudinal axis of said swirling purge gas stream is at an angle with respect to said hole axis.

7. The method of claim 1, wherein a plurality of swirling purge gas streams are introduced into said hole.

8. The method of claim 7, wherein said plurality of swirling purge gas streams are introduced into said hole in parallel flow streams.

9. The method of claim 1, wherein said swirling purge gas stream is introduced in combination with a non-swirling purge gas stream into said hole.

10. The method of claim 1, wherein said swirling purge gas stream is produced by tangential introduction of a purge gas with respect to a hole wall into said hole.

11. A method, for purging of and debris removal from a hole comprising the steps of:
    providing a swirling purge gas stream in a hole containing debris to be removed, said hole being a substantially closed end hole, wherein said swirling purge gas stream is created within a purge gas nozzle and wherein said debris is produced by a laser beam for increasing a depth of said hole;
    imparting a swirl to said debris; and
    lifting said debris from a bottom of said hole.

12. The method of claim 1, wherein said swirling purge gas stream is created directly in said hole.

13. The method of claim 1, wherein said swirling purge gas stream is alternated between a flow condition and a no-flow condition.

14. The method of claim 1, wherein said swirling purge gas stream is alternated between a high flow rate and a lower flow rate.

15. The method of claim 1, wherein said purge gas stream comprises a liquid mist.

16. The method of claim 7, wherein said plurality of swirling purge gas streams are introduced into said hole through a plurality of purge gas nozzles.

17. The method of claim 1, wherein said laser beam is introduced in a continuous manner into said hole.

18. The method of claim 1, wherein said laser beam is introduced in pulses into said hole.

19. The method of claim 18, wherein pulsing of said laser beam is synchronized with pulsing of said purge gas.

20. The method of claim 3, wherein said hole is a substantially closed end hole.

21. The method of claim 20, wherein said swirling purge gas stream is produced by tangential introduction of a purge gas with respect to a hole wall into said hole.

22. The method of claim 11, wherein said hole has a depth to diameter ratio greater than or equal to about 5.

23. The method of claim 11, wherein a longitudinal axis of said swirling purge gas stream is at an angle with respect to a hole axis of said hole.

24. The method of claim 1, wherein a longitudinal axis of said swirling purge gas stream is at an angle with respect a hole axis of said hole.

* * * * *